United States Patent [19]

Kissel, Jr.

[11] Patent Number: 4,685,398
[45] Date of Patent: Aug. 11, 1987

[54] COMPREHENSIVE UNIT TRANSPORTATION SYSTEM

[76] Inventor: Waldemar F. Kissel, Jr., 4321 N.W. 66th Ter., Gainesville, Fla. 32066

[21] Appl. No.: 629,123

[22] Filed: Aug. 14, 1984

[51] Int. Cl.⁴ .............................................. B61B 13/04
[52] U.S. Cl. ...................................... 104/88; 104/118; 104/130; 104/248
[58] Field of Search ................... 104/18, 20, 26 R, 88, 104/118–120, 130, 242, 248, 284, 293, 91, 96; 180/168; 318/587

[56] References Cited

U.S. PATENT DOCUMENTS

| | | | |
|---|---|---|---|
| 951,698 | 3/1910 | Poole | 104/248 |
| 1,001,170 | 8/1911 | Sayer | 104/18 |
| 2,194,057 | 3/1940 | Simpson | 104/26 R |
| 3,118,392 | 1/1964 | Zimmerman | 104/88 |
| 3,249,065 | 5/1966 | Adams et al. | 104/299 |
| 3,368,496 | 2/1968 | Falk et al. | 104/18 |
| 3,403,634 | 10/1968 | Crowder | 104/88 X |
| 3,537,401 | 11/1970 | Metzner | 104/299 |
| 3,552,321 | 1/1971 | Priebe | 104/18 |
| 3,593,668 | 7/1971 | Adams | 104/130 |
| 3,613,599 | 10/1971 | Seidman | 104/18 |
| 3,661,092 | 5/1972 | Morley et al. | 104/299 |
| 3,661,093 | 5/1972 | Searle | 104/299 |
| 3,727,560 | 4/1973 | Blemly et al. | 104/287 |
| 3,759,187 | 9/1973 | Gayot | 104/130 |
| 3,771,463 | 11/1973 | Smoot et al. | 104/155 |
| 3,788,232 | 1/1974 | Schneider et al. | 104/88 |
| 3,823,673 | 7/1974 | Wesener | 104/299 |
| 3,831,527 | 8/1974 | Peterson | 104/130 |
| 3,839,964 | 10/1974 | Gayot | 104/18 |
| 3,845,719 | 11/1974 | Langdon | 104/130 |
| 3,861,317 | 1/1975 | Crowder | 104/88 |
| 3,895,584 | 7/1975 | Paddison | 104/88 |
| 3,913,491 | 10/1975 | Auer, Jr. et al. | 104/130 |
| 3,933,099 | 1/1976 | Sieb | 104/88 |
| 4,018,410 | 4/1977 | Renaux | 246/5 |
| 4,083,309 | 4/1978 | Gerard | 104/18 |
| 4,090,452 | 5/1978 | Segar | 104/247 |
| 4,176,609 | 12/1979 | Allen | 104/88 |
| 4,232,611 | 11/1980 | Uozumi | 105/215 R |
| 4,248,160 | 8/1981 | DeLiban et al. | 180/168 |
| 4,296,901 | 10/1981 | Perrott | 246/167 R |

FOREIGN PATENT DOCUMENTS

| | | | |
|---|---|---|---|
| 2,530,938 | 1/1977 | Fed. Rep. of Germany | 318/587 |
| 2639430 | 3/1977 | Fed. Rep. of Germany | 104/18 |
| 1170761 | 11/1969 | United Kingdom | 104/20 |

Primary Examiner—Randolph A. Reese
Attorney, Agent, or Firm—Jones, Askew & Lunsford

[57] ABSTRACT

A comprehensive transportation system with the ability to transport an individual passenger or a unit of cargo directly from a point of origin to a desired destination. A plurality of vehicles are directed about a network of continuous guideways. The guideways include a raised guide rail and are connected by a plurality of closed loop interchanges. Each vehicle is fitted with a guide rail shoe which facilitates operation of the vehicle on the guideway. The guide rail shoe tracks the raised guide rail, and comprises a switching device that transfers a vehicle from one continuous guideway to another. The guideways are further defined by level-of-service zones. The integrity of each zone is maintained electronically by an operations center and mechanically by a level-of-service screening key.

3 Claims, 25 Drawing Figures

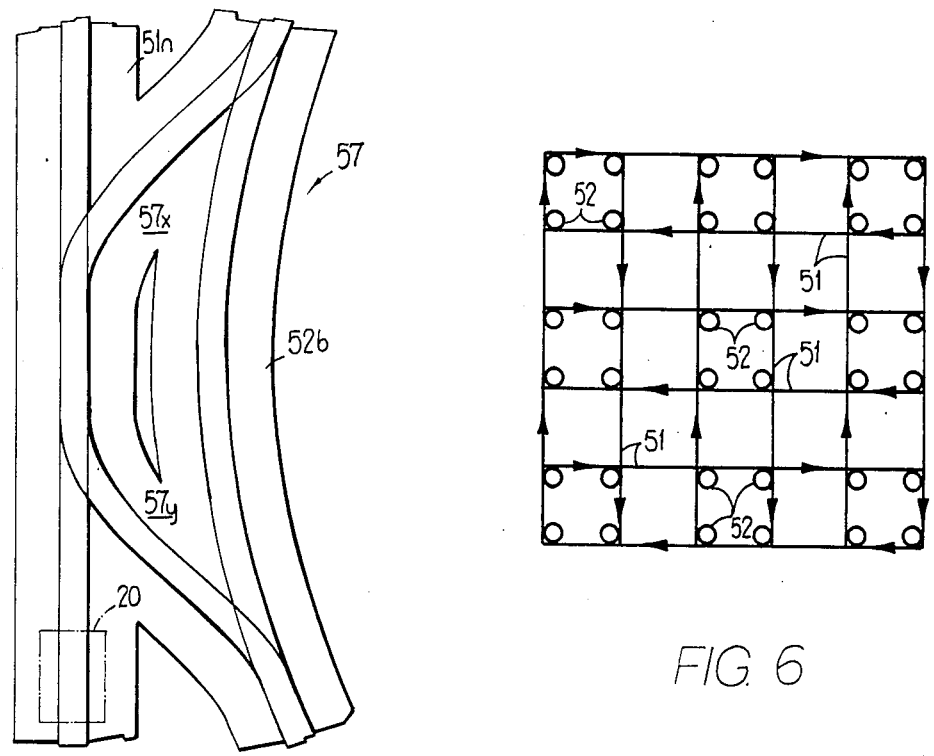
FIG. 5A
FIG. 6
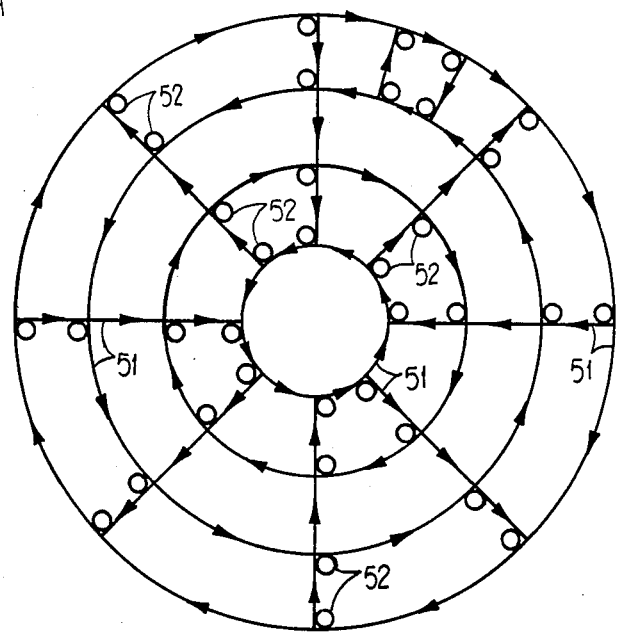
FIG. 7

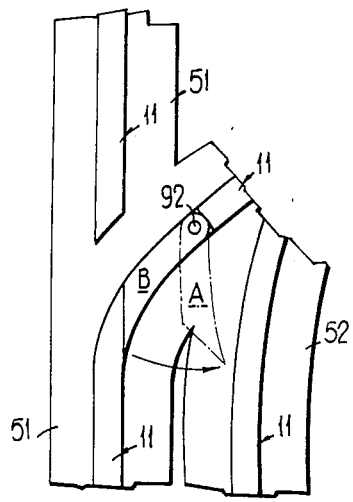
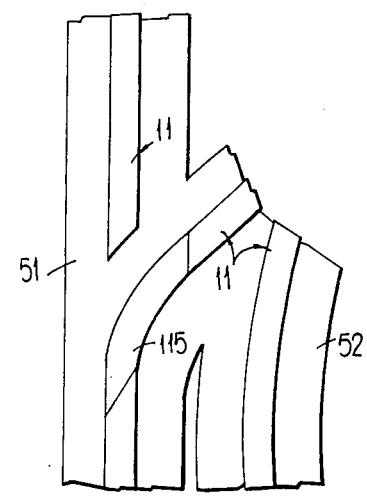
FIG. 11
FIG. 13
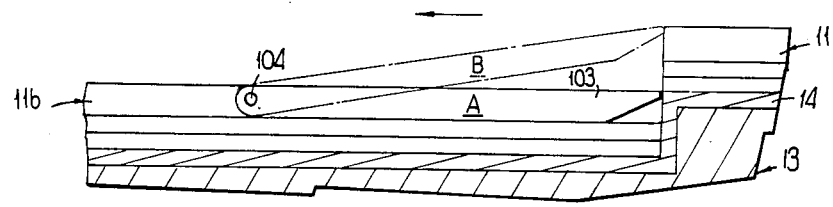
FIG. 12
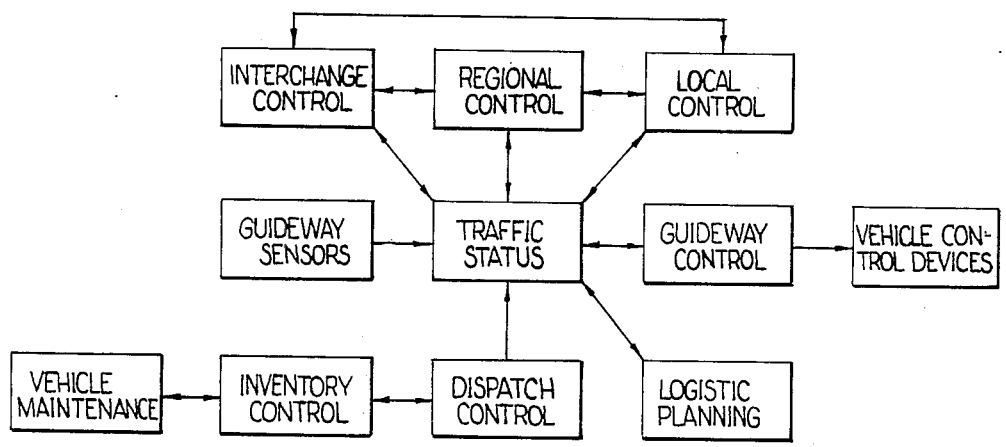
FIG. 14

. 307 308 309 310 311 312 313 314 315 316 317 318 319 320 321 322 323 324 325
FIG 19a
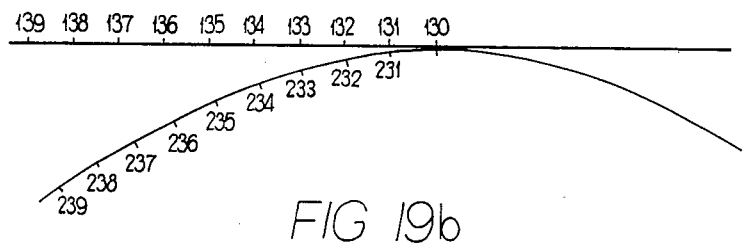
FIG 19b
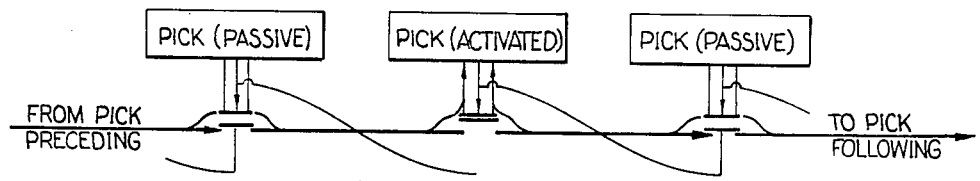
FIG 19c

COMPREHENSIVE UNIT TRANSPORTATION SYSTEM

TECHNICAL FIELD

The present invention relates to transportation, and more particularly, relates to a transportation system wherein a plurality of vehicles are directed through a network of continuous guideways from a source point to a destination point.

BACKGROUND OF THE INVENTION

Various transportation systems are known in the prior art. Each such system constitutes a response to societal demands for quick, convenient and comfortable transportation. These responses may readily be classified as either mass/rapid transit systems or automotive transit systems.

A mass/rapid transit system is designed to serve a large population dispersed over a substantial land area. Examples of mass/rapid systems include airports, subways, railroads, buslines and the like. These transportation systems are typically comprised of a variety of transportation vehicles including airplanes, automobiles, buses, trains and like vehicles.

While they serve a useful function, several problems exist with mass/rapid transit systems. One problem is that travel is segmented. For example, a mass/rapid system passenger travels first to a station, then boards a transportation vehicle, then disembarks from this vehicle upon its arrival at the station nearest the desired destination point and then travels to his or her desired destination point. Thus, mass/rapid transit systems do not provide for a passenger to travel directly from a point of origin to a point of destination.

Another problem with mass/rapid systems is the stations themselves. Each station must provide access and exit for passengers and a variety of transportation vehicles. The problems of scheduling vehicles and passengers are inherent to mass/rapid systems. For example, passengers are often forced to wait for extended time periods before boarding or disembarking a vehicle. Other station related problems are the threat of criminal activity, space utilization, cargo flow and support systems such as food service, rest room facilities and the like. It is not surprising that bus terminals, airports and the like are viewed as obstacles to travel by the general public.

Yet another problem with mass/rapid transit systems is that the transportation vehicles make frequent stops at various stations to board or disembark passengers. For the passenger whose desired destination is beyond such stops, time is wasted as he waits for other passengers to enter or exit the system at intermediate stations. Furthermore, and perhaps because of the above-described problems, no economically self-sufficient rapid/mass transit system has been developed. Tax subsidies are universally required from local, state and federal governments to finance continued operation of these systems.

An automotive transit system differs from a mass/rapid transit system in that it is a unit transportation system. The primary advantage of the automotive transit system is its ability to move a passenger or passengers and cargo directly from point of departure to point of destination with stops necessitated only by the operating requirements of the vehicle. Automotive transit is a primary means of transportation within residential areas and small communities as well as within large regional areas. The public's desire for automotive transit has been vividly demonstrated by its continued and extensive use of automobiles, even in times of soaring fuel prices.

Even so, problems with automotive transit are readily apparent. An extensive and elaborate network of roadways provide a seemingly infinite number of intersections. Each intersection represents an area of high accident risk to both vehicles and passengers. A related problem is two-way street traffic. Ideally, traffic of conflicting directions would be separated to the greatest possible degree. Yet another problem is that the automotive transit system depends extensively on the human interface. Many accidents are the result of errors in judgment by the driver resulting from driver fatigue, driver intoxication, etc.

The ideal transportation system, heretofore unknown in the prior art, would include the beneficial aspects of a mass/rapid transit system and an automotive transit system. In particular, the ideal transportation system would move a passenger and/or cargo directly from a point of departure to a point of destination without stopping. Furthermore, traffic flow would be constant and unidirectional, and conventional intersections would be entirely avoided. The ideal transportation system would additionally provide service as required. For example, it would be able to service small local communities as well as major metropolitan areas. Finally, human error would be removed from any such system, and the system would be self-sufficient to provide an economical means of transportation.

SUMMARY OF THE INVENTION

The present invention solves the above-described problems in the prior art by providing a comprehensive unit transportation system which provides quick and convenient transportation from any addressable source to any addressable destination. The present invention further provides a constant, continuous and unidirectional flow of vehicles upon a comprehensive network of continuous guideways designed to eliminate conventional intersections and the problems associated therewith. The emphasis of a comprehensive unit transportation system according to the present invention is to provide safe, yet rapid and continuous traffic flow upon a novel network of continuous guideways so as to transport a passenger and/or cargo directly from a point of departure to a point of destination.

Generally described, the present invention comprises a network of continuous guideways having closed loop interchanges interconnecting those guideways, a plurality of vehicles suitable for operation upon the guideways, and means for controlling and directing the vehicles through the network of guideways whereby an individual vehicle is directed from a point of origin to a point of destination.

Described more particularly, the present invention is characterized by an ability to transport an individual passenger or a unit of cargo directly from a point of origin to a point of destination. A plurality of vehicles are provided which travel unidirectionally about a network of continuous guideways. The guideways comprise a grid pattern that enables the vehicles to move non-stop at constant and discrete speeds. The guideways are characterized by a multiple width surface and a single raised guide rail. The guideways are connected by a plurality of closed loop interchanges, configured to eliminate conventional intersections. Each vehicle is fitted with a guide rail shoe which interacts and cooperates with the raised guide rail to direct the vehicle upon a guideway. The guide rail shoe tracks the raised guide rail, and provides an electro-mechanical switching device that transfers a vehicle from one continuous guideway to another continuous guideway. The guide rail shoe is further characterized by varying stages of steering sensitivity. The present invention further provides for discrete level-of-service zones within the network of continuous guideways. Vehicles are segregated within these zones according to size, speed, and other like characteristics. The integrity of a particular zone is maintained electronically by an operations center and mechanically by a level-of-service screening key.

Thus, it is an object of the present invention to provide an improved transportation system that includes the beneficial aspects of a mass/rapid transit system and an automotive transit system.

It is a further object of the present invention to provide a comprehensive unit transportation system having a network of guideways upon which a plurality of vehicles move unidirectionally at constant speed without stopping.

It is a further object of the present invention to provide a comprehensive unit transportation system having a network of continuous guideways connected by a plurality of closed loop interchanges to eliminate conventional intersections.

It is a further object of the present invention to provide a comprehensive unit transportation system which utilizes a variety of ground transportation vehicles with distinct level of service zones to transport passengers or cargo directly from a desired point of departure to a desired point of destination.

It is a further object of the present invention to provide a comprehensive unit transportation system that avoids the disadvantages of, but interacts with, present mass/rapid transit systems, and can deploy its own mass/rapid transit vehicles.

It is yet a further object of the present invention to avoid the disadvantages of present automotive transit systems, yet include and adopt the beneficial aspects thereof.

Many other objects, features and advantages of the present invention will become apparent from a reading of the following specification when taken in conjunction with the accompanying drawings.

BRIEF DESCRIPTION OF THE DRAWINGS

FIG. 5A is a top plan view of an embodiment of a guideway switching junction according to the present invention.

FIG. 6 is a diagrammatic view of an embodiment of a closed loop interchange configuration according to the present invention.

FIG. 7 is a diagrammatic view of an embodiment of a closed loop interchange configuration according to the present invention.

FIG. 11 is a top elevational view of an embodiment of a lateral guideway mounted switching mechanism.

FIG. 12 is a side elevational view of an embodiment of an inverted guideway mounted switching mechanism.

FIG. 13 is a top elevational view of an embodiment of a retractable guideway mounted switching mechanism.

FIG. 14 is a diagrammatic view of the flow of information through an embodiment of an operations center according to the present invention.

DETAILED DESCRIPTION

Referring now in more detail to the drawings, in which like numerals indicate like parts throughout the several views, the present invention is described herein in detail, with particular reference to the preferred embodiments thereof. A comprehensive unit transportation system according to the present invention includes one or more of the following basic concepts: (1) a raised guide rail; (2) a guide rail shoe; (3) a continuous guideway network configuration; (4) level of service zoning; and (5) vehicle control mechanisms. It will be appreciated that these concepts have many applications outside the scope of the present disclosure. Thus, these concepts are illustrative of the preferred embodiment, and may be modified without limiting the scope of the present invention as defined in the claims.

Raised Guide Rail

Figure 1:
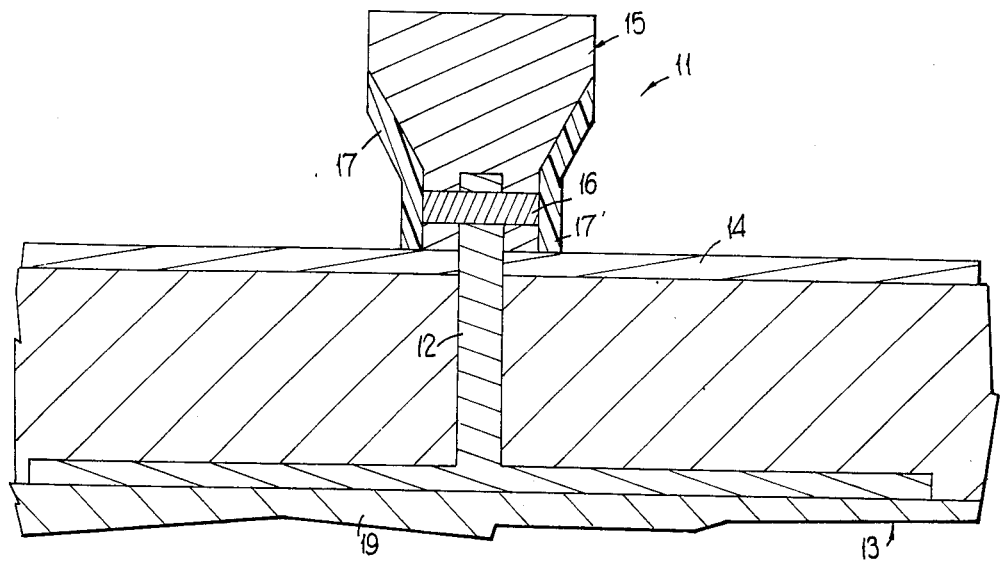
FIG. 1 is a cross-sectional view of an embodiment of a raised guide rail according to the present invention.

The primary structural component of a unit transport system according to the present invention is a raised guide rail, shown generally at 11 in FIG. 1. The preferred raised guide rail 11 includes an anchor member 12 which is embedded within a roadway 13. The roadway 13 includes a paved surface 14. The preferred anchor 12 may be formed of any material of suitable strength and weight to support the rail 11. Suitable materials include, but are not limited to, steel, cast iron, and aluminum. As shown in FIG. 1, the anchor 12 appears as an inverted "T" member. A portion of the vertical extension of the anchor 12 extends above the paved surface 14 of the roadway 13 to operatively engage a surface component 15 of the raised guide rail 11. The surface component 15 of the raised guide rail 11 preferably comprises an elongated T-shaped member, the base of which rests on the paved surface 14 of the roadway 13. The vertical extension of the anchor 12 is fitted through a bored opening (not shown) in the base of the surface component 15. The surface component may be tapered, but is preferably formed so that its base is formed of a reduced cross-sectional area relative to the outwardly extending upper portion thereof. Such a construction prevents a vehicle from inadvertently moving off the guide rail 11. It will be appreciated that various shapes may be provided and retain this benefit of the preferred surface component 15.

The raised guide rail 11 serves three basic purposes. First, as noted immediately above, the preferred guide rail 11 provides a safety feature in that it prevents a vehicle tracking the guide rail from leaving the guideway during a power failure or a like interruption of normal operating procedure. Second, even when the system is operating normally, the preferred guide rail 11 construction prevents a vehicle from derailing or jumping off the guideway as a result of adverse environmental conditions such as ice, snow, mud or wind. Third, the preferred guide rail 11 configuration provides a security feature in that a vehicle cannot be stolen or otherwise removed from the guideway.

As further shown in FIG. 1, the surface component 15 of the guide rail 11 is secured to the anchor 12 by a pin 16. The pin 16 extends the width of the base portion of the surface component 15, and is inserted through a bored opening (not shown) in the uppermost portion of the anchor member 12 to secure the surface component thereto. A plurality of pins 16 and anchors 12 are positioned at suitable intervals along a section of guide rail 11 to insure a stable surface component 15. A contact wear surface 17 is affixed on opposite sides of the surface component 15. The contact wear surface 17 is preferably a thin protective surface that may be replaced when desired due to wear or breakage. Although it is not desired, the surface component 15 of the raised guide rail 11 may physically interact with a vehicle tracking the guide rail. The contact wear surface 17 facilitates this interaction in such a manner as to prevent direct harm to the surface component 15. The contact wear surface 17 is an elongate members which may be formed of any material suitable to withstand repeated contact as described below. Suitable materials include, but are not limited to, rubber, steel, aluminum, and plastic. The contact wear surface 17, as noted above, may be removably attached to the surface component 15 of the raised guide rail 11 to permit quick and simple replacement thereof. Such attachment means are conventional and well known and therefore need not be disclosed further herein.

Figure 2:
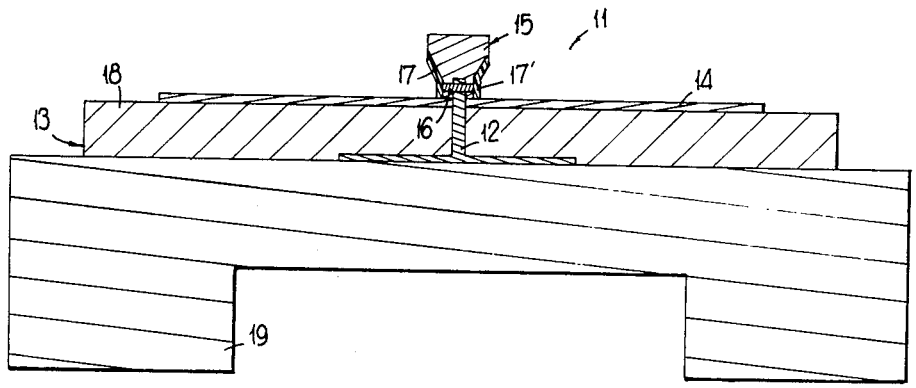
FIG. 2 is a cross-sectional view of an embodiment of a roadbed and raised guide rail according to the present invention.

Vehicles of varying size and weight utilize the raised guide rail 11. To facilitate such varied utilization, the present invention provides a guideway road bed 13 to support these vehicles. As shown in FIG. 2, the preferred road bed 13 is comprised of a paved surface 14, a first level sub-surface 18, and a second level sub-surface 19. The paved surface 14 may be formed of asphalt, concrete or any like material. As described in detail below, the preferred vehicles for use in the disclosed transportation system have wheelbases of four (4), six (6) or eight (8) feet. To protect the paved surface 14, wear surfaces may be provided for the 4 foot, 6 foot, and 8 foot portions of the guideway, designated as A, B and C in FIG. 2.

Further to the road bed 13, any conventional sealant may be employed to provide a constant and uninterrupted surface. The first sub-surface level 18 and second sub-surface level 19 may be any conventional aggregate base including crushed stone or the like. Since vehicles having a wider wheel base are substantially heavier in weight, a greater amount of compacted aggregate is provided in the second level 19 at the extremes of the roadway to support such heavier vehicles.

Thus, the preferred embodiment of the present invention provides a single raised guide rail 11 and a road bed 13 for use by a plurality of vehicles. The guide rail 11 comprises a surface component 15 secured flush to the paved surface 14 of the roadbed 13 by an anchor 12. It will be further seen, as described in detail below, that the guide rail 11 preferably does not guide a vehicle by physical restraint when operating under normal conditions. Instead, it provides a member that can be tracked by a vehicle-mounted sensing component referred to as a guide rail shoe.

Guide Rail Shoe

The raised guide rail 11 interacts with a vehicle by means of a guide rail shoe 40. Generally described, the guide rail shoe 40 comprises an electro-mechanical, vehicle-mounted steering component.

Figure 3:
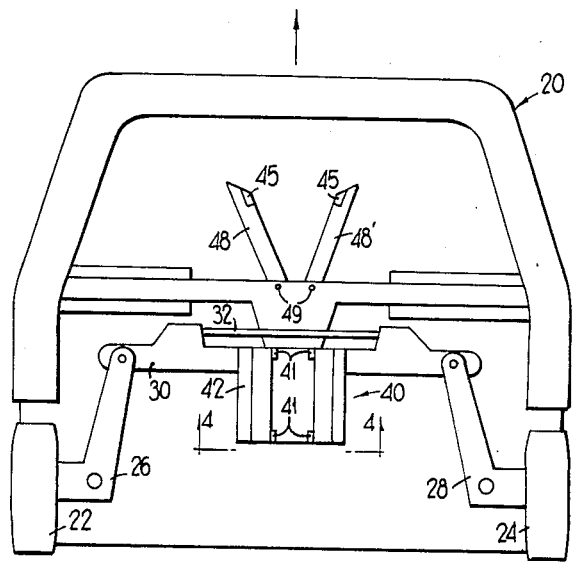
FIG. 3 is a bottom plan view of a vehicle including an embodiment of a guide rail shoe according to the present invention. The forward direction of the vehicle is toward the top of the page.

FIG. 3 shows the underside of a vehicle 20, with the direction of forward movement denoted by the arrow. The vehicle 20 is provided with two front wheels 22 and 24. The front wheels 22 and 24 are manipulated by a steering mechanism which is shown only in part. The steering mechanism includes linkage members 26 and 28, and an interconnecting member 30. The interconnecting member 30 may further include a screw linkage member 32 for manipulating linkage members 26 and 28. It will be appreciated, however, that the steering mechanism may be formed of any conventional apparatus known in the art.

Functionally described, the preferred guide rail shoe 40 is an electro-mechanical, vehicle-mounted component which orientates the vehicle 20 on a guideway relative to the raised guide rail 11. The guide rail shoe 40 constantly locates the guide rail 11, and instructs the steering mechanism accordingly. The preferred embodiment of the guide rail shoe 40 comprises three stages of steering sensitivity: primary, secondary, and emergency backup. It will be appreciated that these three stages of steering sensitivity provide for the vehicle 20 to track or follow the guide rail 11.

Figure 4:
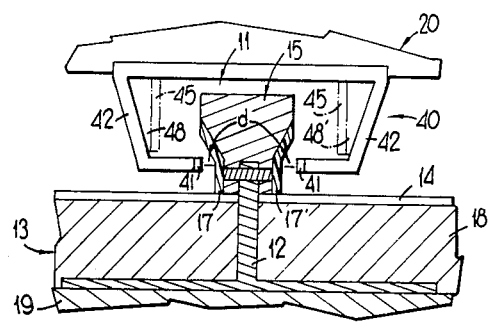
FIG. 4 is a cross-section view of the embodiment of the raised guide rail shoe shown in FIG. 3, taken along line 4—4.

The first level of steering sensitivity provided by the shoe 40 is primary steering. As shown in FIG. 3, four primary steering sensors 41 are located on a narrow throat section 42 provided at the rearward portion of the shoe 40. Such sensors may comprise "electronic eye" photocell assemblies, the technology of which the inventor considers well known and therefore, such sensing means need not be disclosed further herein. Of course, other optical-type sensors or the like could be used. FIG. 4 shows the shoe 40 in operative position with respect to the guide rail 11. As shown best therein, the throat section 42 is U-shaped and the sensors 41 are positioned on opposite sides thereof. As further seen in FIG. 4, one pair of primary sensors 41 rest on the opposite side of the surface component 15 of the raised guide rail 11 from the remaining pair of primary sensors 41.

In operation of primary steering, a desired separation distance is predetermined. This distance denotes the desired distance of separation between the sensors 41 and the surface component 15. Once a desired separation distance of acceptable safety is determined, it is programmed into an onboard microprocessor (not shown). The sensors 41 monitor the actual separation distance from each sensor to the surface component 15, and send constant information to the microprocessor detailing that actual distance. The microprocessor compares the actual separation distance to the predetermined desired separation distance, and instructs the steering mechanism to direct the vehicle in such a manner as to maintain the desired separation distance. Thus, it is to be understood that the microprocessor works with the steering linkage of the vehicle 20 so as to maintain constant distance between the sensors 41 and the guide rail 11. It is furthermore seen that the surface component 15 provides a tracking element which the guide rail shoe 40, and hence the vehicle 20, follow. It is to be further understood that the weight of the vehicle 20 is not borne by the guide rail 11 as in conventional train or monorail technology. Rather, the weight of the vehicle 20 is borne by the road bed 13. The guide rail 11 merely provides a tracking element which the vehicle follows, and preferably, the guide rail shoe 40 will not physically contact the guide rail 11.

The second level of steering sensitivty provided by the shoe 40 is secondary steering. Secondary steering becomes effective only when the primary steering sensors 41, acting in conjunction with the onboard microprocessor and the steering mechanism of a vehicle, are unable to guide the vehicle 20. For example, the rate of curvature per linear foot of guide rail 11 may be so great as to prevent the primary sensors from triggering the steering mechanism quickly enough to prevent contact of the guide rail shoe 40 with the guide rail 11. Thus, as shown in FIG. 3, the present invention provides secondary steering sensors 45 near the front of the vehicle 20 on two flared throat sections 48 and 48'. As with the primary steering sensors 41, the secondary sensors 45 may comprise "electric eye" photocell assemblies. Such technology is considered well known and therefore need not be disclosed further herein. As shown in FIG. 4, the secondary steering sensors 45 are positioned on the flared throat sections 48 and 48' so as to be located on opposite sides of the guide rail 11.

Operation of secondary steering is described by example. Assume that a vehicle 20 encounters such a sharp curve that the rate of curvature per linear foot of guide rail 11 exceeds the ability of the primary sensors 41 to manipulate the primary steering mechanism in response thereto. The secondary steering mechanism first overrides the primary steering mechanism by means of the onboard microprocessor. Once the actual separation distance deviates from the desired separation distance a sufficient predetermined amount, the microprocessor automatically terminates the primary sensors 41 and activates the secondary sensors 45. (As with the desired separation distance, an unacceptable deviation distance is selected and programmed into the onboard microprocessor.) The secondary sensors 45 operate on the same basic principle as the primary sensors, namely, that of comparing the actual separation distance against a predetermined separation distance. Of course, an acceptable safety factor would be incorporated in any such predetermined separation distance. The flared relationship of the throat sections 48 and 48' increases sensor sensitivity by increasing the distance from the sensors to the rails. This permits the guide rail 11 to adopt a significant curvature without loss of steering capability. As further shown in FIG. 3, the flared throat sections 48 and 48' may be pivotally mounted about a center shaft 49. The flared throat sections 48 and 48' are then capable of swinging outwardly from the guide rail 11 and thus, the pivotal mounting permits an even greater curvature of guide rail 11 to be readily compensated for by the secondary steering mechanism.

Secondary steering sensitivity is operative only when primary steering is incapable of directing the vehicle 20. Thus, once the guide rail 11 again adopts a relatively straight orientation, the secondary steering mechanism relinquishes control of the vehicle 20 and returns the steering responsibility to the primary sensors 41. Such relinquishment of control is conveniently accomplished by the onboard microprocessor.

The third level of steering sensitivity provided by the shoe 40 is emergency backup. This steering capability assumes control over a vehicle whenever primary or secondary steering become either inoperative or ineffective. For example, an electrical power failure within a vehicle could render the sensors 41 and 45 and the onboard microprocessor inoperable. Should this occur, the sensors 41 and 45 and the microprocessor will fail to instruct the steering mechanism of the vehicle 20. The predetermined separation distance will not be maintained and the guide rail shoe 40 will make physical contact with the raised guide rail 11. Even so, the U-shaped design of the raised guide rail shoe 40 provides a physical restraint that prevents the vehicle 20 from leaving the guide rail 11. Thus, assuming the vehicle 20 is capable of further travel, the guide rail shoe 40 will keep the vehicle on the roadbed 13 because the U-shaped design of the shoe prevents it from pulling free of the guide rail 11. If the vehicle 20 is incapable of further travel, the emergency backup steering mechanism will permit the vehicle to coast harmlessly to a stop.

It is to be understood that all vehicles according to the present invention include a guide rail shoe 40. Other common vehicular features are provided. For example, each vehicle may include electronic transmitting and receiving equipment. Such equipment would permit communication between any two vehicles and between a vehicle and an operations center (described in detail below). The transmitted information could be utilized to determine the distance between two vehicles or their relative speeds so as to maintain a safe operating distance therebetween. It is also to be understood that the usual manual tasks of steering, accelerating, braking and speed monitoring are performed automatically in response to electronic commands from within a vehicle or transmitted from the operations center. Vehicles according to the present invention therefore further include devices which respond to such instructions so as to automatically manipulate the vehicle according to these commands. Those skilled in the art will recognize that the potential for human error is thus reduced to provide a safer transportation system.

The present invention further provides vehicles of differing characteristics. Although such vehicles can otherwise be of conventional construction for travel on paved roadways, vehicles having the following characteristics are preferred for practice of the present invention:

Vehicle Type I—The preferred type I vehicle is designed for residential use only and capable of only fifteen miles per hour. This vehicle is very small, light-weight, and is preferably constructed having a four foot wheel base. A type I vehicle has a maximum passenger capacity of six persons.

Vehicle Type II—A type II vehicle is identical to a type I vehicle except it is capable of speeds up to thirty miles per hour. Both the type I and type II vehicles are designed for residential use.

Vehicle Type III—A type III vehicle is able to maintain speeds of up to sixty miles per hour, has a four foot wheel base, and a passenger capacity of six persons. However, this vehicle is not designed for extended travel. Its contemplated use is short-term, namely, over a regional area.

Vehicle Type IV—This vehicle is designed for extended travel, and is capable of speeds of up to one hundred miles per hour. Since extended travel is contemplated, various comfort and entertainment features are incorporated, the details of which are beyond the scope of this disclosure. A type IV vehicle has a preferred wheel base of six feet, a passenger capacity of 6 and is constructed so as to withstand extensive high speed usage. Conceptually described, this vehicle would represent "the family car".

Vehicle Type V—A type V vehicle is capable of speeds up to sixty miles per hour, has a seating capacity of fifty passengers and a wheel base of six feet. Thus, this vehicle would be used for rapid disbursement and collection of large groups of people over a regional or metropolitan area to provide a shuttle or similar type transportation service.

Vehicle Type VI—This vehicle is designed for long-distance travel. A type IV vehicle has a seating capacity of fifty passengers, and is capable of speeds up to one hundred miles per hour. A type VI vehicle is constructed having a six-foot wide wheel base and further includes restroom facilities, food/snack facilities, reclining seats, and like features.

Vehicle Type VII—A type VII vehicle is essentially a type VI vehicle. However, a type VII vehicle is constructed having an eight-foot wheel base.

Vehicle Type VIII—A type VIII vehicle is not designed for passengers. Rather, it is preferred that a Type VIII vehicle carry relatively light cargo over short distances. A type VIII vehicle is constructed having a four-foot wheel base and is capable of maintaining a speed of thirty miles per hour.

Vehicle Type IX—A type IX vehicle is also a cargo vehicle, but is designed for medium weight industrial loads. Primary considerations of a type IX vehicle are a maximum potential speed of sixty miles per hour and a six-foot wheel base.

Vehicle Type X—Yet another cargo vehicle, the preferred Type X vehicle is designed to carry heavy loads over substantial distances. Primary considerations of a type X vehicle are, therefore, a maximum potential speed of one hundred miles per hour and an eight-foot wheel base. Additionally, since operation of this vehicle is confined to industrial areas and to the long distance 100 m.p.h. guideways, a Type X vehicle may be allowed to carry great weights. For example, a Type X vehicle may be allowed a gross weight of up to 100,000 lbs.

Vehicle Type XI—A type XI vehicle is preferably a self-powered vehicle capable of being attached to and pulling one or more other smaller, non-powered cargo vehicles. Thus, a Type XI vehicle is somewhat like the locomotive of a train. A Type XI vehicle is preferably confined to those guideways permitting a speed of sixty (60) m.p.h. Of course, a more powerful vehicle could be provided to achieve a higher speed.

Vehicle Type XII—A type XII vehicle is preferably a self-powered vehicle similar to a Type XI vehicle for pulling one or more passenger vehicles. Because the type XII vehicle preferably transports passengers, it is designed to enter Regional Mass/Transit terminals (described below) and other passenger departure and destination points.

It will be appreciated that the straightforward construction of the guide rail shoe 40 permits its adaptation to any and each of the above-described vehicles. Thus, various modifications may be made in the above-described characteristics of any transportation vehicle without departing from the spirit and scope of the present invention.

Continuous Guideway Network Configuration

The present invention further provides a comprehensive network of continuous guideways. It is to be understood that vehicles 20 fitted with a guide rail shoe 40 travel about and within this network of continuous guideways. As described in detail hereinbelow, the continuous guideway network configuration provides a dynamic model or pattern of traffic flow wherein any particular vehicle travels constantly, continuously and unidirectionally through the network from a point of departure to a point of destination.

A continuous guideway according to the present invention includes a raised guide rail 11 projecting above a roadway 13 to interact with the raised guide rail shoe 40 as described above. The guideway is continuous in that it provides no physical stopping limitation. Thus, the preferred continuous guideway network configuration is devoid of any "dead ends", and "cul-de-sacs" or any other impediment to constant and continuous vehicular traffic flow.

Figure 5:
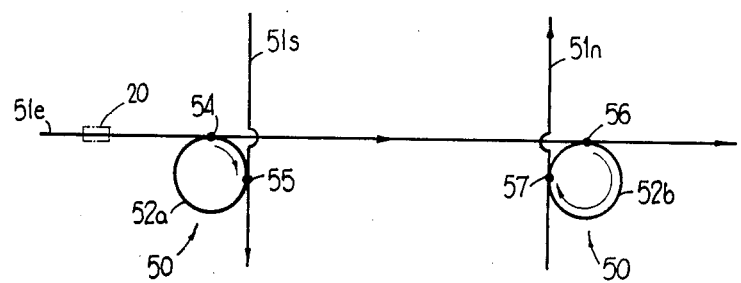
FIG. 5 is a diagrammatic view of an embodiment of a closed loop interchange configuration according to the present invention.

The primary element of the preferred continuous guideway network configuration is a closed loop interchange, shown generally at 50 in FIGS. 5, 6 and 7. The closed loop interchange 50 facilitates non-stop transfer of a vehicle from one continuous guideway to another by providing a transitional interface therebetween. For example, the closed loop interchange 50 is shown in FIG. 5 as providing a transitional interface between several through traffic guideways 51. A through traffic guideway may be likened to a conventional limited access street or highway. Traffic flow on any continuous guideway is unidirectional. The through traffic guideways in FIG. 5 have therefore been denoted according to the direction of vehicular travel thereon. Thus, all traffic on guideway 51e travels easterly. Similarly, all traffic on guideways 51n and 51s travels north and south, respectively.

It is a principal concept of the present invention that, at any point of interface between two continuous guideways, there must be provided a merge junction and an accompanying exit junction. Implementation of this concept is found in the closed loop interchange 50. As shown in FIG. 5, each closed loop interchanges 50 provides a continuous guideway loop 52a and 52b. Continuous guideway loop 52a includes two transitional interfaces 54 and 55 that, as described below, provide for vehicular transfer between through traffic guideways 51e and 51s. Similarly, continuous guideway loop 52b includes two transitional interfaces 56 and 57 that, as also described below, provide vehicular transfer between through traffic guideways 51e and 51n. It is to be understood that, at each transitional interface, a vehicle may exit a through traffic guideway and enter a continuous guideway loop, or, a vehicle may exit a continuous guideway loop and enter a through traffic guideway.

Operation of the closed loop interchange 50 is described by example. FIG. 5 shows three primary guideways 51e, 51s and 51n. As noted above, all vehicles on a continuous guideway travel unidirectionally. Thus, all vehicles on guideway 51e travel easterly, all vehicles on guideway 51s travel south, and all vehicles on guideway 51n travel northerly. Similarly, all vehicles on the guideways 52 travel clockwise. A vehicle, shown generally at 20 in FIG. 5, is moving in an easterly direction on primary guideway 51e, and is approaching a first interchange loop 52. It is assumed that the passengers in vehicle 20 wish to travel in a southerly direction along primary guideway 51s. To accomplish this change of direction, the vehicle 20 exits primary guideway 51e at transitional interface 54, and enters the closed loop interchange 52a. The vehicle 20 continues on the interchange loop 52 until it reaches the transitional interface 55. At transitional interface 55, the vehicle 20 exits the interchange loop 52, enters the primary guideway 51s, and travels thereon in a southerly direction.

As a yet further example, assume vehicle 20 is traveling easterly along primary guideway 51e, and the passengers therein desire to travel north on primary guideway 51n. The vehicle 20 would not exit at transitional interface 54 because such exit would direct the vehicle 20 onto primary guideway 51s as described above. To travel in a northerly direction, the vehicle 20 continues on primary guideway 51e past transitional interface 54 and under primary guideway 51s until it reaches transitional interface 56 of the second interchange loop 52b. To accomplish the desired directional change, the vehicle 20 exits primary guideway 51e at transitional interface 56 and enters the interchange loop guideway 52b. The vehicle 20 continues on the interchange guideway 52 until it reaches transitional interface 57. At transitional interface 57, the vehicle 20 exits the interchange loop 52b and travels in a northerly direction on primary guideway 51n.

Thus, it is seen that the term "closed loop interchange", as used herein, refers to a continuous guideway loop that provides a transitional interface to facilitate vehicular transfer between other continuous guideways. As noted above, the transitional interface includes an exit component and a merge component. This is visually described in FIG. 5a, which shows transitional interface 57. As shown therein, the continuous guideway loop 52b tangentially interfaces with through traffic guideway 51n. An exit guideway 57x is provided to facilitate transfer of a vehicle 20 from the through traffic guideway 51n onto the continuous guideway loop 52b. Furthermore, a merge guideway 57y is provided to facilitate transfer of a vehicle 20 from the continuous guideway loop 52b to the through traffic guideway 51n.

A closed loop interchange according to the present invention further provides a traffic flow buffer zone. For example, should a through traffic guideway be inaccessible to a vehicle desiring to merge due to heavy or excessive utilization, the vehicle may be directed around the continuous guideway loop until it can merge safely onto the through traffic guideway. This feature of the present invention prevents stopping due to normal or increased utilization of the system. Rather than permitting vehicles to stop and wait until merger is possible, a vehicle moves continuously about the continuous guidway loop.

To further increase the efficiency of traffic flow about the preferred net work of continuous guideways, the present invention provides for traffic speeds on any particular continuous loop guideway to be modulated. As described in greater detail below, the speed of a vehicle or vehicles on a continuous guideway loop may be slowed slightly for a brief period of time to stagger the position of a vehicle on a continuous guideway loop relative to the position of a vehicle on a through traffic guideway. The result of this staggering is to provide an open position on the through traffic guideway of sufficient size to permit merger of the vehicle.

Several advantages of the present invention become immediately apparent. It will be appreciated that traffic flow on any continuous guideway is unidirectional. Thus, vehicles no longer require the mechanical capability of traveling in reverse. Furthermore, the hazards associated with two-way traffic flow on a single street in automotive transit systems are entirely eliminated. It will be further appreciated that no conventional intersections exist in the preferred continuous guideway network configuration. Thus, the potential for vehicle collisions as a result intersecting lines of traffic flow is substantially minimized. Additionally, the closed loop interchange renders conventional intersections unnecessary because an interface is provided to transfer vehicles between guideways. As shown in FIGS. 6 and 7, the closed loop interchange concept may be adapted to various traffic flow patterns. FIG. 6 shows adaptation of the closed loop interchange principle to a squared grid pattern. FIG. 7 shows further adaptation of the closed loop interchange principle to a circular grid pattern. It will be appreciated by one skilled in the art that the closed loop interchange is a flexible concept readily adaptable to any number of situations to achieve the objectives of the present invention. The closed loop interchange is thus adaptable to rural and urban areas alike.

The preferred continuous guideway network configuration further provides means for switching a vehicle from a guideway to another guideway. As noted above, its junction comprises a merge point and an exit point. The present invention provides two basic types of switching:

(1) vehicle mounted switching-switching action initiated by mechanical or electronic devices built into the vehicle.

(2) guideway mounted switching-switching action initiated by mechanical or electronic devices built into the guide rail; and The present invention further provides three types of vehicle mounted switching: (1) lateral, (2) inverted, and (3) free-float; and three types of guideway mounted switching: (1) lateral, (2) inverted, and (3) retractable.

Vehicle Mounted Switching

Lateral vehicle mounted switching is accomplished automatically onboard the vehicle. A vehicle approaching a transitional interface receives an electronic impulse either from the operations center (described below) or from a signal generator (not shown) within the passenger compartment of the vehicle. Thus, it will be appreciated that a vehicle may be directed either internally by a passenger or an onboard computing device, or remotely by an outside source. In operation, the electronic impulse translates into a command to the steering linkage of the vehicle, which proceeds to steer the vehicle to the right. To insure vehicle 20 switching, the flared jaws of the guide rail shoe 40 may be hinged on one or both sides thereof so that the raised guide rail 11 of the exit guideway engages the guide rail shoe 20 of the vehicle. Such a hinged assembly would insure vehicle switch even in the event of a steering malfunction. The guide rail shoe of the vehicle disengages from the primary guideway, and then locates and secures itself to an exit guideway. The vehicle then tracks the guide rail of the exit guideway as described above.

Figure 8:
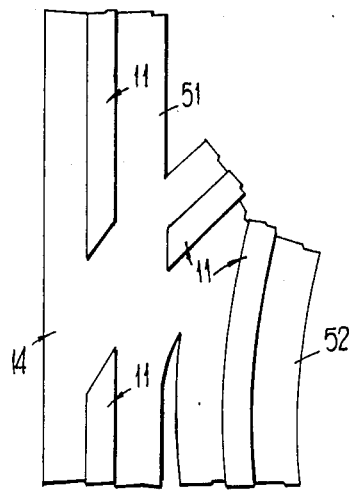
FIG. 8 is a top plan view of an embodiment of a guideway junction adapted for lateral vehicle mounted switching.

To facilitate such movement of the vehicle, the raised guide rail 11 of a primary guideway 51 is interrupted as shown in FIG. 8. In particular, the raised guide rail 11 of primary guideway 51 is interrupted diagonally to permit the wheels of an exiting vehicle to pass therethrough. Furthermore, without such an interruption of the raised guide rail 11, the emergency backup steering sensitivity of the guide rail shoe 40 would prevent any exiting of a vehicle 20 from the primary guideway 51. In a similar fashion, a separation is provided between the raised guide rail 11 of primary guideway 51 and the raised guide rail 11 of exit guideway 52. This separation permits the wheels of vehicles continuing to travel on the primary guideway to bypass the exit guideway 52. As noted above, the present invention provides vehicles having different wheel base widths. Thus all such separations must be of sufficient dimension to facilitate passage of the largest vehicles. Of course, various modifications could be made. Even so, it is to be understood that this form of vehicle switching is accomplished by means of the guide rail shoe 40 secured to the underside of the vehicle 20.

Figure 9:
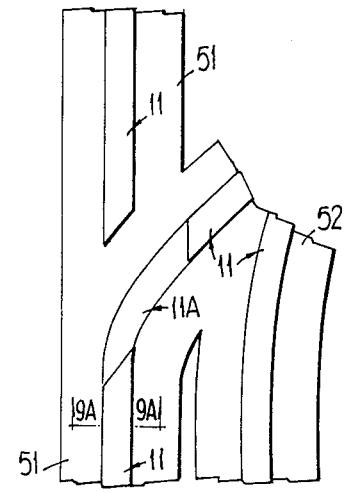
FIG. 9 is a top plan view of an embodiment of a guideway junction having a recessed guide rail adapted for inverted vehicle mounted switching.
Figure 9A:
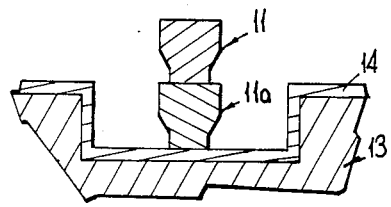
FIG. 9A is a section view of the embodiment shown in FIG. 9 taken along line 9A—9A.

Inverted vehicle mounted switching is also accomplished by means of an onboard component. As shown in FIG. 9, a raised guide rail 11 and a primary guideway 51 are provided as in the lateral vehicle mounted switching configuration shown in FIG. 8. Likewise, an exit guideway 52 is provided with a raised guide rail 11. However, the preferred configuration of guide rails for inverted vehicle mounted switching includes a second guide rail 11a, located immediately below the primary guide rail 11. The second, lowered guideway 11a connects the primary guideway 51 with the primary exit guideway 52. As shown in FIG. 9A, the second guide rail 11a is fixed in a depression at a position flush with the paved surface 14 of the guideways 51 and 52. Inverted vehicle mounted switching further includes a pneumatic cylinder (not shown) or like device in association with he raised guide rail shoe 40 which, when activated, causes the U-shaped shoe to move downwardly, and close about the lower guide rail 11a. Thus, the downward movement of the shoe 40 positions it about the second guide rail 11a. Once engaged on the second guide rail 11a, the shoe 40 then tracks the second guide rail 11a to effect the turn. Once the vehicle is on the exit guideway 52, the pneumatic cylinder or like apparatus releases and allows the guide rail shoe 40 to retract to its normal position as the guide rail 11A emerges from the recess to assume the height of the upper guide rail 11. It is thus seen that the vehicle 20 does not change its vertical position, but rather only the guide rail shoe 40 moves vertically. As in lateral vehicle mounted switching, the primary raised guide rail 11 is interrupted to permit the wheels of an exiting vehicle to pass therethrough. Vehicles continuing past the exit guideway 51 drive over the lower second guide rail 11a.

Figure 10A:
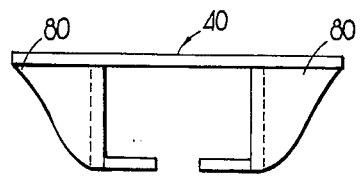
FIG. 10A is a front elevational view of the embodiment of a guide rail shoe shown in FIG. 10.
Figure 10:
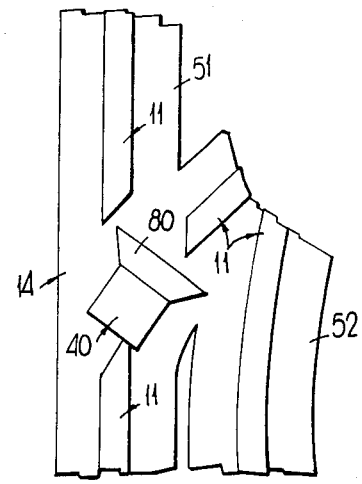
FIG. 10 is a top elevational view of an embodiment of a guide rail shoe fitted with an adapter for free float vehicle mounted switching effecting a guide rail change.

Free-float vehicle mounted switching is accomplished by an adapter designed for use with the guide rail shoe 40. As shown in FIGS. 10 and 10A, a guide rail shoe 40 is fitted with a flanged extension 80. The purpose of the flanged extension 80 is to coordinate a directional change by physical contact of the shoe 40 and the raised guide rail 11. Such means of effecting a directional change is required when emergency backup steering sensitivity is operative but could be used as the principal switching means. In operation, as the vehicle turns to the right, the flanged extension 80 catches and directs the shoe 40 onto the raised guide rail 11 of the exit guideway 52. Free-float vehicle mounted switching further includes a separation of the guide rails 11 as shown in FIG. 8 (lateral vehicle mounted switching). Described more particularly, assume a vehicle 20 is instructed to turn by the operations center. At the appropriate time, the steering mechanism of the vehicle 20 will direct the vehicle to the right. The shoe 40 will disengage from the primary guide rail 11. The concave shape of the flanged extension 80 coordinates association of the shoe 40 to the exit guide rail 11. As shown in FIG. 10, the left portion of the adapter 80 will catch and direct the shoe 40 onto the raised guide rail 11 of the exit guideway 52.

This method of switching is therefore readily likened to the emergency backup steering system wherein the actual physical components of the raised guide rail 11 and the raised guide rail shoe 40 serve to effect the change in direction. One skilled in the art will recognize that, as in emergency backup steering sensitivity, free-float vehicle mounted switching is not preferred since it represents a forced physical interface of the raised guide rail 11 and the guide shoe 40.

Guideway Mounted Switching

A lateral guideway mounted switching mechanism according to the present invention is shown in FIG. 11. Lateral guideway mounted switching includes a hinged extension rail member 91 pivotally mounted upon a pin 92 at that end of an exit guideway 52 guide rail 11 nearest a primary guideway 51. The pivotal mounting of extension member 91 provides for lateral rotation thereof in a substantially horizontal plane. When no vehicle is exiting the primary guideway 51, the hinged extension member 91 appears in position A as shown in FIG. 11. Thus, vehicles bypassing the exit guideway 52 may do so without interruption or interference. To direct a vehicle onto the exit guideway 52, the hinged extension member 91 is pivoted into position B in FIG.

11. Such location of the hinged extension 41, in combination with either the primary, secondary or emergency backup steering mechanisms described above, serves to direct the vehicle onto the guide rail 11 of the exit guideway 52. After the vehicle has entered the exit guideway 52, the hinged rail extension member 91 pivots back to position A to permit other vehicles to bypass the exit guideway.

An inverted guideway mounted switching mechanism, as shown in FIG. 12, includes a hinged extension member 103 pivotally mounted upon a pin 104 located on a recessed guide rail 11b. The inverted guideway mounted switching further includes a second lower guide rail 11a as shown in FIG. 9 for inverted vehicle mounted switching. The hinged extension member 103 is mounted for rotation in a substantially vertical plane to operatively engage the extension to the primary guide rail 11. As shown in FIG. 12, a vehicle travels from right to left. When no vehicle 20 is exiting the primary guideway 51, the hinged extension member 91 appears as shown in position A in FIG. 12. The guide rail shoe 40 continues to track the raised guide rail 11 and continues along the primary guideway 51 associated therewith. To direct a vehicle 20 onto the exit guideway 52, the hinged extension 103 is pivoted into position B as shown in FIG. 12. Such rotation of the hinged extension 103 causes the raised guide rail shoe 40 to be pulled down onto the recessed guide rail 11b (such movement of the shoe may be accomplished by a pneumatic cylinder or like device as described above) and thereby directs the vehicle 20 onto the exit guideway 52.

A retractable guideway mounted switching device, shown generally of FIG. 13, comprises a recessed connecting guide rail 15. When no vehicle is exiting to guideway 52, the recessed connecting guide rail 115 rests flush with the paved surface of the guideway. The wheels of the guideway pass over the connecting guide rail 115. Upon receipt of an electronic impulse command either from a vehicle or the operations center, the recessed connecting guide rail 115 raises to the height of the primary guide rail 11 and the exit guide rail 11. Once so raised, primary, secondary or energency backup steering guides the vehicle onto the exit guideway 52 by tracking the connecting guide rail 115.

The present invention further provides for electronic sensors (not shown) to be placed at strategic positions near a switching junction. The function of these sensors is to insure accident-free merging and exiting of vehicles onto and from a guideway. Although many methods may be utilized, it is preferred that a series of sensors be placed on the two merging guideways at positions equidistant from a junction. The sensors would relay the position of a merging or exiting vehicle and the position of the other vehicle already on the primary guideway to the operations center. The operations center includes computerized computer means that would maintain a predetermined safety distribution of vehicles. The merging vehicle is electronically instructed to slow down or speed up to insure a safe merge.

In a similar manner, electronic sensors may be placed at strategic positions along a primary guideway to monitor the progress of vehicles along that guideway. Such sensors communicate directly with the operations center described in detail below, and are utilized to measure the distance between any two vehicles on a guideway, the speed of any vehicle or the relative speeds of any two vehicles. The sensors may comprise "electric eye" devices, the technology of which is well known. An alternative form of vehicle monitoring may include transmission of vehicle positions directly from the sensors to the vehicle so as to permit speed adjustment, directional change, and like operations to be performed by the on-board microprocessor.

Of course, various modifications of the continuous guideway network could be effected. Thus, it should be understood that the above relates only to the preferred embodiment, and that any such modifications are within the scope of the present invention.

Level of Service Zoning

The present invention further provides for the segregation of vehicles on the guideways according to speed, size and/or function, while yet integrating their operation over a network of guideways. Referred to as level of service zoning, the present invention provides for a variety of vehicles to share a network of guideways even though such vehicles have many varied characteristics. Described in brief, level of service zoning restricts a vehicle to a particular zone or zones with which it is compatible.

The present invention provides five distinct levels-of-service zones. These zones are as follows:

Level 1: Neighborhood—A neighborhood zone includes residential or other heavily populated areas. Vehicles on a level 1 guideway are permitted a maximum speed of fifteen miles per hour and are constructed with a four-foot or six-foot wide wheel base. Thus, type I, II, III IV, IX and VIII would be permitted in this zone.

Level 2: Collector-Distributor—A collector-distributor guideway permits only those vehicles having a four-foot or six foot wide wheel base, and restricts speeds to thirty miles per hour. Thus, type II, III, IV IX and VIII vehicles would be permitted in this zone.

Level 3: Regional—A regional zone includes guideways which restrict vehicles traveling thereon to four- or six-foot wheel bases, and restricts speed to sixty miles per hour. Acceptable vehicle types are therefore III, IV, V, VI, IX and XI.

Level 4: Long-Distance Zone—A long-distance zone includes guideways designed for high-speed extended travel. This zone permits vehicles having wheel base widths of six and/or eight feet, and restricts speed to one hundred miles per hour. Thus, passenger and cargo vehicle types IV, VI, VII, X, XII and XIII are permitted.

Level 5: Cargo Zone—This zone includes guideways identical to those in level four, but restricts all traffic to cargo vehicles IX, X and XII. These would have a very low speed to allow the bulky/heavy vehicles to access industrial areas of a region.

A vehicle may not enter an incompatible level-of-service zone. For example, a Type VII vehicle is incompatible with a Level 1 service designation because its wheelbase dimension is eight feet, and a neighborhood zone guideway is restricted to vehicles having four foot and six foot wheelbases. Similarly, a Type I vehicle is unable to transfer from a level-of-service zone 1 to a level 2 service zone because a Type I vehicle is not capable of travel at 30 miles per hour. Thus, the vehicles are segregated by size and speed for safety. (As a further precaution, the level-of-service screening key described below provides a physical barrier to improper transfers.)

This segregation of vehicles within the various level-of-service zones is done at the oeprations center. In sum, the operations center comprises a clearinghouse of system information. FIG. 14 is a diagrammatic view of the flow of information through the operations center. As shown therein, the present embodiment provides three traffic flow controls: (1) interchange control, (2) regional control, and (3) local control. Each of these control functions is a computer program designed to route traffic flow within a particular subsystem of the comprehensive unit transportation system.

Local control is designed to route traffic flow within a local guideway system such as Level 1 and 2 guideway zones. Should a vehicle need to leave the level 1 or 2 zones to reach a desired destination, its route is planned by regional control. This computer program determines the preferred route, and relays that route to another program—Traffic Status. Regional control also relays the route to the Interchange Control program. Because, each closed loop interchange is preferably programmed individually, interchange control includes a program for each closed loop interchange. A preferred method of interchange control programming is to generate a vehicle identification number and a closed loop interchange identification number for each transitional interface junction on the interchange. For each closed loop interchange, a numeric list of vehicles that are to use that interchange is generated as well as which junctions are to be used by each. The timing of vehicles utilizing a particular closed loop interchange is then determined within such listing. Of course, various programs may be developed.

The interchange, regional and local control programs also interface with a traffic status program. Generally described, the traffic status function is a tabulating program which monitors the current state of the system. The traffic status program receives information from guideway sensors which monitor the position of vehicles within the system. Traffic status also receives input from dispatch control, inventory control, and vehicle maintenance. The vehicle maintenance program monitors and updates the status of vehicles needing repair. The inventory control program monitors and updates the number of vehicles available for dispatch. The dispatch control program allocates the available vehicles. Preferably, the dispatch control program compares the number of available vehicles monitored by the inventory control program with system vehicle demand (described immediately below), and dispatches vehicles accordingly. The demand for vehicles within the system is projected and anlyzed by the logistic planning program, which also inputs to the traffic status program. The logistic planning program determines where all traffic originates and terminates, what type of vehicles have been requested, the distance of each trip, time of day, time reuqired for each trip, and other like information. From such information, the logistic planning program generates a projected vehicle utilization schedule.

The traffic status control program interfaces directly with a guideway control program. The guideway control program receives updated information as to the state of the system from traffic status. The guideway control program then implements the desired traffic flow as developed by the logistics planning program. The guideway control program implements the desired traffic flow by sending electronic impulses to the vehicle control devices. Thus, it is seen that the operations center not only provides a clearing house of system information, but further provides an operative system hub, directing and controlling traffic flow throughout the system. In particular, the oeprations center segregates the vehicles within their appropriate level of service zones.

To further insure such segregation of vehicles, the present invention provides level-of-service screening keys. Each vehicle is fitted with a front and a rear "key". These level-of-service screening keys, as described below, make it physically impossible for a vehicle incompatible with a particular guideway to enter that guideway.

Figure 15:
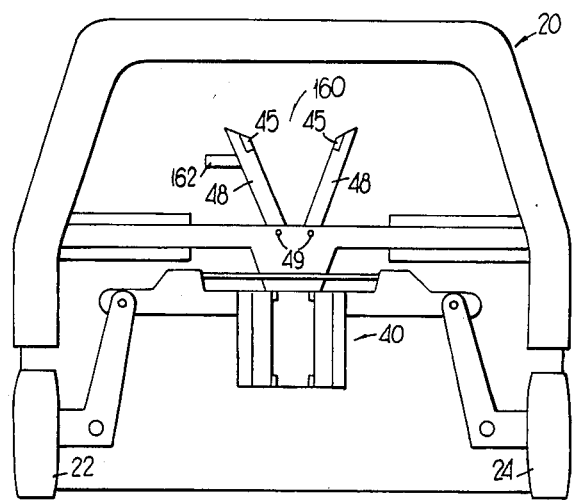
FIG. 15 is an underside view of a vehicle according to the present invention including an embodiment of a vehicle mounted level-of-service screening key.
Figure 16:
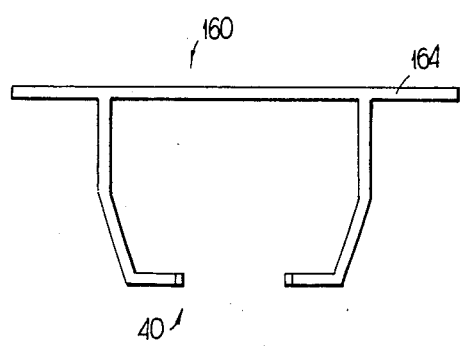
FIG. 16 is a front elevational view of a guide rail shoe including an alternative embodiment of a vehicle mounted level-of-service screening key.
Figure 17:
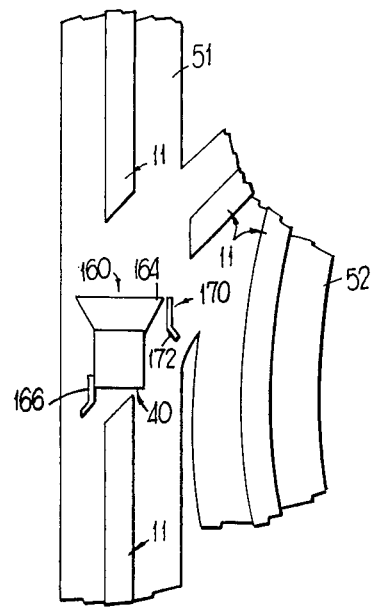
FIG. 17 is a top elevational veiw of a guide rail shoe including embodiments of the vehicle mounted level-of-service screening keys.

A level-of-service screening key according to the present invention consists of a guideway mounted component and a vehicle mounted component. As shown in FIG. 15, a first embodiment of the vehicle mounted component 160 includes a stylus 162 which is secured to and extends from the right flared throat section 48 of the raised guide rail shoe 40. A second embodiment is shown in FIG. 16, wherein the vehicle component comprises an extension 164 of the shoe 40. The extension 164 consists of a flat bar member placed across the front top surface of the shoe 40. A third vehicle mounted component is an extension member 166 which extends rearwardly of the shoe 40. As shown in FIG. 17, the extension member 166 protrudes from the left rear side of the shoe 40. The guideway mounted component 170, as shown in FIG. 17, comprises a short guide rail segment 172. The screening key guide rail segment 172 is of reduced height relative to a raised guide rail 11, yet of sufficient height to make contact with the vehicle mounted component 162 or 164 as described below.

Operation of the level-of-service screening key for a vehicle attempting to access a higher guideway for which it is incompatible is disclosed by example. Assume that a Type I vehicle attempts to enter a Level III service zone designation. As shown in FIG. 17, the guide rail shoe 40 of the type I vehicle is equipped with an extension 164 that extends outwardly from the raised guide rail 11. Assume the extension 164 is formed so as to extend outwardly a distance of 14 inches from the raised guide rail 1. Assume further that the Level III screening key guide rail segment 172 is positioned a distance of 9 inches from the raised guide rail 11 of the primary guideway 51. As the vehicle 20 attempts to exit, the guide rail segment 72 will contact the extension member 164 at a location approximately 5 inches from the remote end of the extension member. The shoe 40 is thereby physically stopped from moving onto the exit guideway 52. Thus, the level-of-service screening key prevents incompatible vehicle from entering a zone level higher than its compatibility.

Operation of the level-of-service screening key for a vehicle attempting to access a lower level-of-service guideway for which it is incompatible is also disclosed by example. Assume that in FIG. 17 a large cargo vehicle Type X is to be screened from a Level III regional guideway. The Type X vehicle includes a guide rail shoe 40. The shoe 40 includes an extension member 166 which extends from the left rearward portion of the raised guide rail shoe. As the vehicle, and in particular the shoe, attempts to negotiate the turn, the flanged extension 166 is constructed so as to catch on the primary guide rail 11 immediately after its diagonal separation. The shoe 40 (and therefore the vehicle) is thus prevented from making the turn. To facilitate such action of the level-of-screening key for other level of service zones, the vehicle mounted component may be shortened or lengthened as desired. Since the gap provided in a guide rail will vary according to the speed of traffic utilizing that guideway, the shoe is accordingly lengthened or shortened to effect contact of flanged extension 166 with the surface component 15.

Vehicle Control Devices

The present invention further provides devices to control and monitor the movement of vehicles within the comprehensive network of continuous guideways. Of course, various devices could be provided. For example purposes, two principal control devices are disclosed: (1) merge and exit controls; and (2) control devices for maintaining a safe operating distance between vehicles on a continuous guideway.

As previously noted, it is a principal tenant of the present invention that each transitional interface provide an exit component and a merge component. The purpose of the merge/exit control devices is to synchronize vehicle traffic on the closed loop interchange, including any through traffic or other connecting continuous guideway, so that a vehicle may exit or enter the continuous guideway loop without interference to any traffic on through traffic guideways.

To accomplish this purpose, traffic on the continuous guideway loop is modulated. Stated more particularly, traffic on a continuous guideway loop may be decelerated to a lower velocity to either allow a vehicle to exit a through traffic guideway, or to stagger the position of the vehicle on the continuous guideway loop relative to the position of a vehicle on the through traffic guideway so as to permit merger without interference. It is to be understood that traffic on the through traffic guideway (or other continuous guideway that is interfaced with a closed loop interchange) is not disturbed. Thus, traffic on the through traffic guideway moves constantly at a predetermined speed, i.e. 15, 30, 60, or 100 m.p.h. Preferably, it is only the traffic on the continuous guideway loop that is modulated.

The present invention provides two types of merge/exit control: primary and secondary. Secondary control is a strict and straightforward application of the continuous movement/constant velocity feature of the present invention. Generally described, secondary control is a final determination of whether-to merge or exit; a simple "GO" or "NO GO" determination. If the decision is "GO", the vehicle concerned exits or merges. If the decision is "NO GO", the vehicle remains on its present guideway, whether that be a through traffic guideway or a continuous guideway loop. Primary control is a relaxed application of the continuous movement/constant velocity feature of the present invention in that it allows interchange traffic to be modulated. Primary control is the preferred operating technique. Secondary control is an emergency or back-up technique that supplements primary control in the event of its malfunction.

Figure 19D:
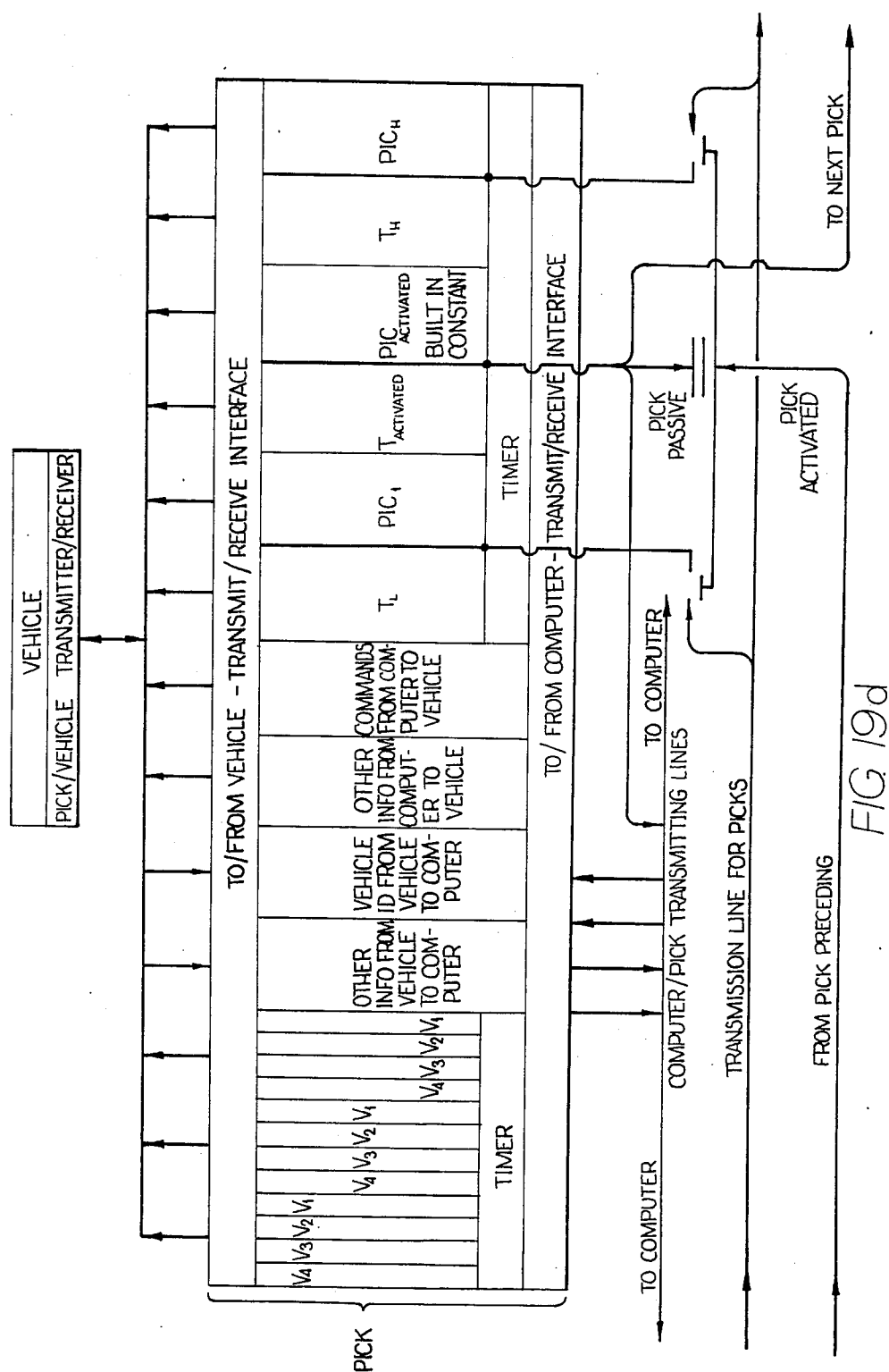
FIGS. 19a, b, c, and d are diagrammatic views of a series of coordinating devices for maintaining a safe operating distance between vehicles on a continuous guideway.

As described in detail below, primary control requires a greater amount of time and distance in that a vehicle's velocity is adjusted or modulated to permit exit or merger. The preferred method of primary control is described by example. Assume that, as shown in FIG. 19, a vehicle 20 exits a through traffic guideway 51n at transitional interface 200, and starts to travel around the continuous guideway loop 52. The passengers in the vehicle 20 desire to travel westerly on through traffic guideway 51w. Thus, the vehicle 20 must merge onto through traffic guideway 51n at transitional interface 202. Assume further that two vehicles 20a and 20b are traveling on guideway 51w.

In accordance with the preferred form of primary exit/merge control, three pairs of sensors 305, 306 and 307 are positioned on the continuous guideway loop 52 as shown. Additionally, three pairs of sensors 310, 311, and 312 are positioned on the through traffic guideway 51w as shown. The sensors 305–307 and 310–312 are strategically place. More particularly, sensors 305 and 310 are equidistant from transitional interface 302. Similarly, sensor pairs 306 and 311, and sensor pairs 307 and 312 are also equidistant from transitional interface 302. As a vehicle passes over each pair of sensors, the vehicle is electronically identified by the sensors, its speed is calculated and the time is recorded.

The above-described device provides means for insuring a safe merger of vehicle 20 onto through traffic guideway 51w. To continue with the example, readings are taken to determine the time lapse between vehicle 20a passing sensor pair 210 and vehicle 20 passing sensor pair 205. The time elapsed is multiplied by the velocity of vehicle 20a. If this product is greater than a predetermined required clearance for merging vehicles, then vehicle 20 is clear to merge onto through traffic guideway 51w. Of course, this algorithm may be repeated to determine if sufficient clearance exists for vehicle 20 to merge without interferring with vehicle 20b.

Of course, other means could be provided. For example, the initial time readings of sensor pairs 205 and 210 could be compared to insure that a proper clearance distance is present.

Assume further that the required clearance is not present. Then, the speed of vehicle 20 must be modulated in order to generate an acceptable clearance. It is to be noted that a brief decrease in speed produces a significant staggering of vehicles. For example, assume that all vehicles 20, 20a and 20b are traveling at 60 m.p.h. The speed of vehicle 20 may be reduced 5% (to 57 m.p.h.) for a period of 5 seconds to shift its position relative to either vehicle 20a and 20b a distance of twenty-two (22) feet. Of course, as noted above, if the vehicles 20 and 20a or 20 and 20b remain on a collision course, vehicle 20 may be redirected around continuous guideway loop 52.

The present invention further provides means for maintaining a safe operating distance between vehicles on a continuous guideway. Broadly speaking, the present invention provides two approaches: external means and internal means. External means refers to the provision of signal technology to detect or transmit to leading and following vehicles relevant information concerning the position of one particular vehicle. Internal means refers to utilization of a vehicle mounted device that transmits to guideway mounted devices through lines in the raised guide rail to other vehicles and system control computers. As described in detail below, an internal system using position identification constants is preferred because it provides the most efficient solution to not only maintaining a safe operating distance between vehicles, but has further application to the merger/exit control function described above.

The implement external means for maintaining a safe operating distance between vehicles, each vehicle is provided with a radio frequency transmitter and receiver. The transmitter expels a continuous signal that is received by the immediately preceding and succeeding vehicles on a segment of continuous guideway. This signal carries information pertaining to the present position and speed of that vehicle. This vehicle is also receiving similar input from the immediately preceding and suceeding vehicles. Through this exchange of information, an on-board microprocessor may be utilized to determine whether a proper distance exists between vehicles. It is the opinion of the applicant that such technology is known to those skilled in the art, and hence, need not be disclosed further herein.

As noted above, internal means for maintaining a safe operating distance between vehicles may be implemented using direct transmission from a vehicle mounted device to guideway mounted devices, through lines in the guide rail to other vehicles and system control computers. Conceptually described, implementation of the internal system involves dividing the length of the raised guide rail 11 in discrete segments of equal length. The end point of each such segment is assigned a numerical value, hereinafter referred to as a position identification constant. The length of each such segment, while preferably being equal, may be selected as desired. As will be seen from reading the following description, the shorter the segment length selected, the greater the resolution of the system. An example of a position identification coordinate system is shown in FIG. 20A, wherein the numeric values 307–325 have been sequentially assigned at the endpoint of several segment lengths.

In accordance with the internal system, an electronic apparatus (hereinafter referred to as a "pick") is placed at each segment endpoint, as defined by the position identification constant. Each such electronic apparatus includes a sensing device, a receiving device, a transmitting device, a timing device and a comparator device (such as a microprocessor). It is preferred that each electronic apparatus be hardwired to the immediately preceding and the immediately succeeding electronic apparatus. If desired, radio frequency transmission/-reception devices or fiber optic technology may be employed.

It is the exchange of information that is gathered, transmitted and received by each pick that insures a safe operating distance between vehicles. To facilitate this exchange, each pick has a passive and an active state. Under normal operating conditions, the pick is in a passive state. In the passive state, the pick allows a signal being carried along the wires between other picks to travel past it. This signal constitutes an electronic impulse corresponding to the position identification constant.

A pick generates a signal carrying such a position identification constant only when a vehicle passes by it. Thus, a particular pick always generates the same position identification constant. This signal travels in both directions along wires in the guide rail. This signal will operate to activate only the pick that is immediately in front of it, such direction being defined by the direction of vehicular travel. Thus, referring to FIG. 20a, when a vehicle $V_3$ passes over pick 317, the position identification constant 317 is electronically generated by the pick at that location, and transmitted in the direction of the picks located at 316 and 318. Only pick 318 is activated when the signal generated by pick 317 passes it.

An activated pick will not allow a signal carrying the position identification constant to flow past it. Instead, an activated pick will retain the first position identification of highest value that it receives in a buffer memory, and count time from the moment of such reception.

Furthermore, an activated pick will retain in yet another buffer memory the first position identification of lower value that it receives, and count time from the moment of such reception. The activated pick will further count time from the moment it is first activated. Thus, referring again to FIG. 20a, when a vehicle $V_4$ passes over a pick 321, the pick 318 will receive, retain and block the signal carrying position identification constant 321, and being counting time. When a vehicle $V_5$ passes over pick 323, a signal is generated carrying position identification constant 323, but it will never reach pick 317. Instead, this signal carrying position identification constant 323 will be received, retained and blocked at pick 321 or pick 322, depending on which is activated at that instant when vehicle $V_5$ passes over pick 323.

To continue with the example, when vehicle $V_2$ passes over pick 313, a position identification constant numeral 313 is generated. This signal will be received, retained and blocked at pick 318. Pick 318 will begin counting time from the moment that such signal is received. Meanwhile, pick 318 is also counting time from the moment it was activated by vehicle $V_3$ passing over pick 317. When vehicle $V_1$ passes over pick 310, it will generate a signal carrying the position identification constant numeral 310. This signal will be received, retained, blocked and timed, as described above, at either pick 313 or pick 314, depending on the location of vehicle $V_2$ at that instant.

It is to be noted that pick 318 can actually receive only one higher position identification constant (319) and only one lower position identification constant (317).

When the vehicle $V_3$ passes over pick 318, the electronic apparatus of pick 318 transmits to vehicle $V_3$ the following information: the position identification constant 318; the time of its activation; the position identification constant 321 (as generated by vehicle $V_4$ passing over pick 321); the time that the signal carrying position identification constant numeral 321 is retained; position identification constant numeral 313 (as generated by pick 313 when vehicle $V_2$ passes thereover); and the time period over which the signal carrying position identification constant numeral 313 is retained. Pick 318 then transmits position identification constant numeral 318 into the lines (and back to a integrally connected computer). Then, pick 318 initializes all memory, timing devices and other comparator features so as to return to a passive state. Thus, it is to be understood that pick 318 has completed one cycle. It is to be noted that a pick, as an electronic apparatus, is not merely a computing or logic device. Rather, it is a fixed sequence receiver buffer memory as used in conjunction with a transmitter and planning device. If desired, a comparator unit may be carried on board a vehicle. Such a comparator unit could contain appropriate information with which to maintain a particular distance between any two vehicles.

If a vehicle has such an on-board computing device, it will know the precise location of vehicle $V_3$ because pick 318 is unique. Similarly, the location of any other vehicle may be monitored by systems computers integrally connected with the hard wires for the purpose of monitoring the location of a particular vehicle. If a numeric value for a desired separation between vehicles is to be calculated, the following algorithms may be employed.

$$C[(\text{POSITION IDENTIFICATION CONSTANT}_{HIGH} + \text{TIME}_{HIGH}) - (\text{POSITION IDENTIFICATION CONSTANT}_{ACTIVATED})] \cdot [\text{VEHICLE SPEED}] = \text{LEADING VEHICLE SEPARATION} \quad \text{a.}$$

$$C[(\text{POSITION IDENTIFICATION CONSTANT}_{ACTIVATED}) - (\text{POSITION IDENTIFICATION CONSTANT}_{LOW} + \text{TIME}_{LOW})] \cdot [\text{VEHICLE SPEED}] = \text{FOLLOWING VEHICLE SEPARATION} \quad \text{b.}$$

(Where C is a constant with a value 1 when the distance between picks is the same as the numerical value of velocity in feet per second. Further, T is set to a value from zero to one giving the assigned velocity for the guideway.)

Further to the coordinating of merging and exiting vehicles, the position identification constant and pick electronic apparatus can also provide a means of primary control. It is to be understood that a comparator, such as a microprocessor, may be provided either in conjunction with the entire system or on board a particular vehicle for the purpose of coordinating exit and merge activity.

Such utilization of the position identification coordinate and pick electronic apparatus is shown schematically in FIG. 20b. Referring thereto, FIG. 20b shows vehicles $V_1$ and $V_3$ traveling on a guideway. As shown, these vehicles $V_1$ and $V_3$ are traveling to the right and have just crossed picks 135 and 136, respectively. As a result, pick 135 sent a signal to pick 235 (as indicated by an arrow). This transmission started a counter/timer denoted $T_{lead}$ in FIG. 20d. Additionally, a similar, simultaneous signal was transmitted to pick 234. The receipt of this signal activated a counter labeled $T_{follow}$ in FIG. 20d. Similarly, the vehicle $V_3$ when it crossed pick 136, caused counters in picks 236 and 235 to intiate counting sequences. These timers count incrementally and then are initialized to a zero (0) position until another vehicle passes thereover. Thus, when a vehicle $V_2$ passes over pick 235, the pick 235 will transmit to suitable devices on board vehicle $V_2$ the time when the leading vehicle $V_1$ and the following vehicle $V_3$ passed a known position. This known position is pick 135 for vehicle $V_1$ and 136 for vehicle $V_3$. The comparator circuits within the on-board computing device are then able to determine the position of vehicle $V_2$ relative to vehicle $V_1$ and vehicle $V_3$. The appropriate velocity decisions may then be made and implemented to provide a safe merge or exit. The signals from picks 135 and 136 comprise electronic impulses that activate timing mechanism. Thus, in this alternative embodiment of coordinating merging and exiting vehicles, the signals need carry no information.

It should be noted that there exists no internal means for computers monitoring and coordinating system use to communicate directly with any particular vehicle, except for that information that is exchanged through the pick electronic apparati. Therefore, a pick may be improved upon to provide a buffer memory that is capable of storing commands, data, information and message to and from vehicles and to and from system computers. Additionally, this transmitting ability may be upgraded to allow a two-way transfer of information, thereby allowing for message to be sent and received between any particular vehicle and pick and between a pick and system computer. The flow of information is depicted schematically in FIG. 20d.

The following is a set of examples designed to demonstrate the preferred embodiment of the present invention as described hereinabove.

EXAMPLE 1

Figure 18:
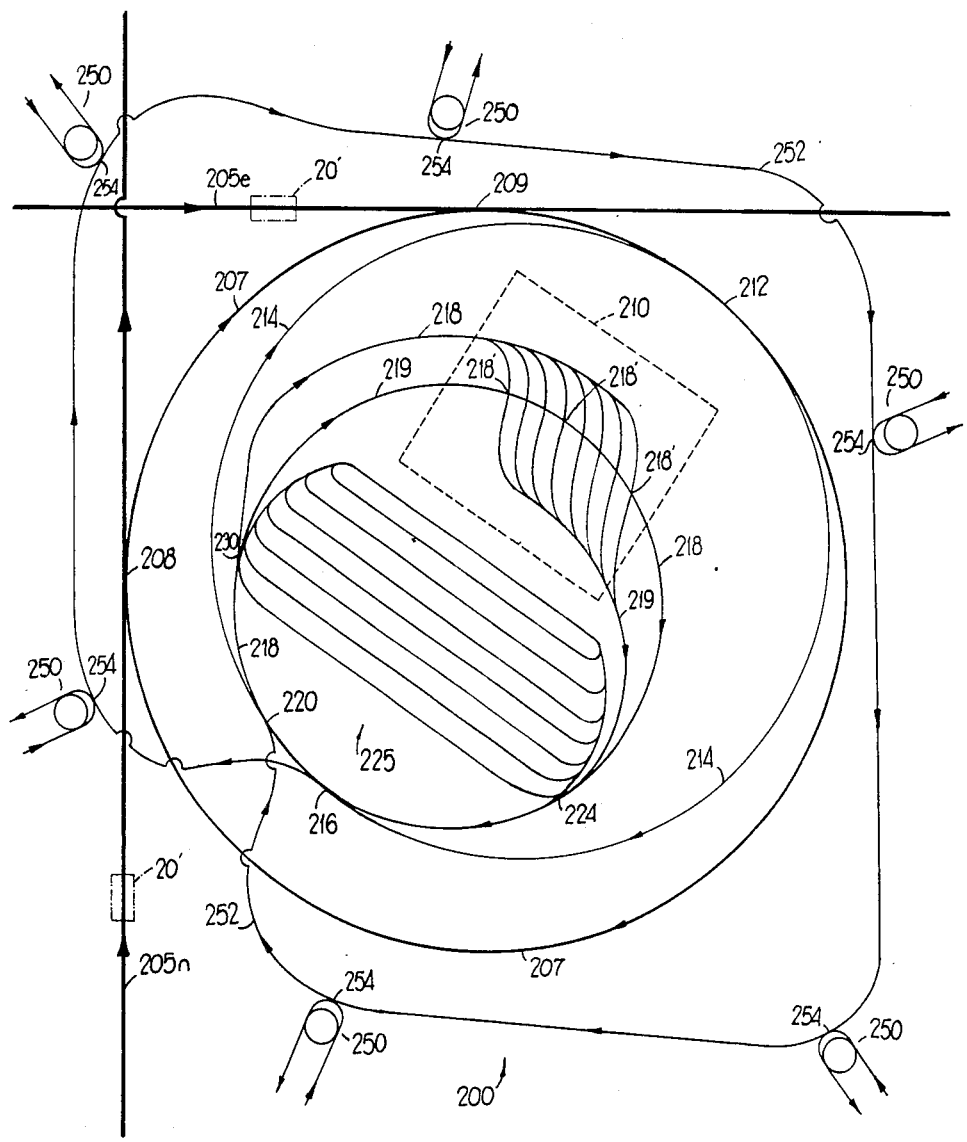
FIG. 18 is a diagrammatic view of an embodiment of a closed loop interchange according to the present invention.

FIG. 18 shows a regional interchange 200 and two primary guideways 205n and 205e. Primary guideway 205n is a continuous guideway on which traffic flows northerly, and primary guideway 205e is a continuous guideway upon which traffic flows easterly. It is to be understood that each primary guideway 205n and 205e includes a raised guide rail 11. A closed loop interchange 207 according to the present invention is provided to facilitate movement of vehicles from one primary guideway to the other. The interchange loop 207 intersects the primary guideways 205n and 205e at junctions 208 and 209, respectively. The preferred embodiment of the present regional interchange design 200 provides that primary guideways 205n and 205e, as well as the closed loop interchange 207, are Level 3 guideways. Thus, vehicles having either four or six foot wheel bases may travel thereon and a constant speed of 60 miles per hour is maintained by each vehicle. In particular, vehicle types II, III, IV, and V are permitted travel on these guideways. The present regional interchange 200 further includes a mass transit station, shown diagrammatically as a rectangular area 210. The preferred mass transit vehicle is a type V vehicle.

This first example demonstrates a type III vehicle entering the station 210. It is assumed that the type III vehicle, shown diagrammatically at 20, is traveling in a northerly direction on primary guideway 205n. The vehicle 20 must first exit primary guideway 205n and enter the interchange loop 207. This would be accomplished at junction 208, at which point the vehicle would enter and travel along the interchange loop 207 until it reached junction 209. One skilled in the art will appreciate that any of the above-described switching methods could be utilized to effect such a directional change. At junction 209, the vehicle could enter primary guideway 205e. However, to enter the station 210, the vehicle must continue on the interchange loop 207 until it reaches yet another junction 212. At junction 212, the vehicle must leave interchange loop 207 and enters a second loop, shown in the diagram as an internal interchange loop 214. It is to be noted that the vehicle 20 has not reversed its direction, but is continuing in a clockwise direction. The vehicle 20 then passes directly through a junction 216 and enters yet another internal interchange loop 218 at junction 220. To enter the station 210, the vehicle 20 would remain on this inner loop 217, pass through junction 230, and continue on loop 218 until it reached an disembarking position 218'. After the passengers had disembarked, the vehicle 20 would continue along loop 218 until it reached interchange junction 224, at which point the vehicle 20 would enter the parking loops 225 until further use thereof was required.

EXAMPLE 2

In much the same manner, a shuttle transport vehicle type V enters the station 210. Assume such a vehicle 20' is traveling east on primary guideway 205e. To enter the station 210, the shuttle 20' enters the interchange loop 207 at junction 209. It then enters the first internal interchange loop 214 at junction 212, and at junction 220 enters the innermost interchange loop 218. However, at junction 230, instead of following loop 218, the vehicle 20' follows internal loop 219 so as to pass through the station 210 and pick up or deposit passengers from platforms 218'. To leave the station 210, the vehicle 20' would continue on interchange loop 219 past junction 224 until reaching junction 216. At junction 216, the vehicle 20' would enter interchange loop 214 and continue on that loop to junction 212, at which junction it would enter interchange loop 207. The vehicle 20' is now in position to travel either in a northerly direction on primary guideway 205n by exiting the interchange loop 207 at junction 208, or in an easterly direction by exiting the interchange loop 207 at junction 209.

EXAMPLE 3

It is to be further understood that a vehicle need not be traveling on a primary guideway to enter the mass transit station. For example, a vehicle may be traveling on a collector guideway 250. To enter the station 210, such a vehicle would exit the collector guideway 250 and enter a perimeter station collector guideway 252 at a junction 254. Once on the station collector guideway 252, the vehicle would travel along that guideway until it reached junction 220, at which point it would enter the internal interchange loop 218 and continue thereon as described above. Thus, it is to be understood that the present guideway configuration network is flexible and capable of adaptation to a variety of needs.

The present invention also provides that the interchange loops 207, 214, 218 and 219 be constructed to facilitate speed control. For example, that portion of internal interchange loop 214 between junctions 212 and 216 may be inclined upwardly to gravitationally slow vehicles entering junctions 216 and 220. Similarly, that portion of internal loop 214 between junctions 220 and 212 could be sloped downward so as to gravitationally increase the speed of vehicles exiting the closed loop interchange. One skilled in the art will appreciate that the speed of vehicles entering the station may also be segregated according to the level of a service designations described in detail above. The present invention further includes that electronic sensing means may be placed at strategic positions about the various guideways to insure accident free mergers as described above.

It is thus seen that the present invention enjoys many advantages over the prior art. The present invention provides a network of continuous guideways which eliminates conventional intersections by means of the closed loop interchanges. Furthermore, all traffic on a particular guideway travels unidirectionally. Thus, the present invention provides a safer transportation system. A unit transportation system according to the present invention moves a passenger or a unit of cargo directly from a point of origin to a point of destination. Thus, time is saved and the system is more efficient. A transportation system according to the present invention further provides a comprehensive electronic monitoring and operating center. Thus, the potential for human error is significantly reduced if not eliminated.

It should be understood that the foregoing relates only to the preferred embodiment of the present invention and that numerous modifications or alterations may be made therein without departing from the spirit and scope of the invention as set forth in the appended claims.

I claim:

1. A transportation system comprising;
   a network of guideways comprising through guideways crossing one another at different levels to define a plurality of intersections, each of said through guideways comprising a T-shaped raised guide rail anchored to a roadbed surface, said guideways being segregated into level-of-surface zones according to a predetermined, substantially constant, traffic speed;
   said network of guideways further comprising at least one tangential loop transfer guideway interconnecting said through guideways at each of said intersections each of said tangential loop transfer guideways including a T-shaped raised guide rail secured upon one of a plurality of roadbed surfaces and having at least one point of tangency with one of said through guideways, said point of tangency being characterized by a merge rail segment, a loop rail segment unconnected to said through guideway, and an exit rail segment;
   a plurality of self-propelled vehicles adapted for unidirectional travel about said network of through guideways and tangential loop transfer guideways, said vehicles each including a downwardly extending guide rail shoe enveloping said raised guide rail so as to physically constrain each of said vehicles upon said guideway, each shoe further comprising means for electronically sensing said raised guide rail such that said vehicle tracks said raised guide rail,
   said vehicles being designated for travel within one or more of said level-of-service zones; and
   means for selectively guiding said vehicles from a point of origin to a point of destination within said network of guideways, said guiding means including means for selectively guiding a first vehicle on one of said through guideways and a second vehicle on one of said tangential loop transfer guideways such that upon said first vehicle and said second vehicle reaching said point of tangency at the same time, said first vehicle moves at constant speed along said through guideway and said second vehicle is directed around said tangential loop transfer guideway via said loop rail segment at constant speed.

2. The transportation system of claim 1 wherein each of said level-of-service zones include means for permitting only said designated vehicles to enter each said level-of-service zone, said permitting means comprising a level-of-service screening key including a vehicle mounted component and a guideway mounted component.

3. The transportation system of claim 2, wherein said vehicle mounted component of said level-of-service screening key comprises a horizontal member attached to said vehicle, and said guideway mounted component of said level-of-service screening key comprises a raised rail member located immediately prior to said merging point and parallel to said raised guide rail, whereby contact of said horizontal member mounted on said vehicle with said raised rail member prevents entrance of said non-designated vehicle into said zones.

* * * * *

UNITED STATES PATENT AND TRADEMARK OFFICE
CERTIFICATE OF CORRECTION

PATENT NO. : 4,685,398
DATED : August 11, 1987
INVENTOR(S) : Waldemar F. Kissel, Jr.

It is certified that error appears in the above-identified patent and that said Letters Patent is hereby corrected as shown below:

Replace column 19, line 59 through column 20, line 29 with:

--As described in detail below, primary control requires a greater amount of time and distance because a vehicle's velocity is adjusted or modulated to permit exit or merger. The preferred method of primary control is described by example. Assume that a vehicle is travelling north on a through traffic guideway. The vehicle exits this through traffic guideway at a transitional interface and starts to travel around the continuous guideway loop. The passengers in the vehicle desire to travel eastwardly on a through traffic guideway. Thus, the vehicle must exit the guideway loop and merge onto the through traffic guideway upon which vehicles travel in an easterly direction. Assume

UNITED STATES PATENT AND TRADEMARK OFFICE
CERTIFICATE OF CORRECTION

PATENT NO. : 4,685,398

DATED : August 11, 1987

INVENTOR(S) : Waldemar F. Kissel, Jr.

It is certified that error appears in the above-identified patent and that said Letters Patent is hereby corrected as shown below:

further that two vehicles are travelling easterly on this through traffic guideway.

The vehicle on the closed interchange loop must merge onto the eastward through traffic guideway without interfering with the two vehicles travelling easterly on that through guideway. In accordance with the preferred form of the primary exit/merge control, three pairs of sensors are positioned on the continuous guideway loop. Additionally, three pairs of sensors are positioned correspondingly on the through guideway upon which vehicles travel in an easterly direction. All such pairs of sensors are strategically placed. More particularly, the first pairs of sensors on the through guideway and on the continuous guideway loop are positioned equadistant from the merge point, otherwise referred to as a transitional interface. The second pairs of sensors are likewise placed equadistant from the transitional interface, but somewhat closer than the first pairs of sensors. Finally, the third pair of sensors are also positioned equadistant from the transitional

UNITED STATES PATENT AND TRADEMARK OFFICE
CERTIFICATE OF CORRECTION

PATENT NO. : 4,685,398

DATED : August 11, 1987

INVENTOR(S) : Waldemar F. Kissel, Jr.

It is certified that error appears in the above-identified patent and that said Letters Patent is hereby corrected as shown below:

interface upon the through guideway and the transfer guideway respectively, but somewhat closer than the second pair of sensors. As a vehicle passes over each and any pair of sensors, its position is recorded, speed calculated and the time noted electronically.

The preferred form of primary exit/merge control provides means for a safe merger of the transferring vehicle onto the eastward through guideway. These readings and recordings can further be manipulated to derive the relative position of the vehicle on the continuous guideway loop. The relative velocity and spacing calculations for all of the vehicles are then compared. If the spacing between the two easterly travelling vehicles is sufficiently greater than a predetermined clearance value, the vehicle on the continuous guideway loop is authorized to merge onto the through traffic guideway upon which vehicles travel in an easterly direction. Of course, this algorithm may be repeated to determine if sufficient clearance exists for a vehicle to exit the guideway.- -

UNITED STATES PATENT AND TRADEMARK OFFICE
CERTIFICATE OF CORRECTION

PATENT NO. : 4,685,398

DATED : August 11, 1987

INVENTOR(S) : Waldemar F. Kissel, Jr.

It is certified that error appears in the above-identified patent and that said Letters Patent is hereby corrected as shown below:

At column 20, line 30, change "of sensor pairs 205 and 210" to -- recorded by the outermost pair of equidistant sensors.--

Signed and Sealed this

Twenty-fourth Day of January, 1989

Attest:

DONALD J. QUIGG

Attesting Officer

Commissioner of Patents and Trademarks